FIG. I.

INVENTORS:
WILLIAM L. GROSS
JOHN O.P. HUGHES
BY Babcock & Babcock
ATTORNEYS

INVENTORS:
WILLIAM L. GROSS
JOHN O.P. HUGHES

BY Babcock & Babcock
ATTORNEYS

April 29, 1952 W. L. GROSS ET AL 2,594,642
GEARING OF ACCESSORIES FOR GAS TURBINES
Filed Feb. 21, 1949 3 Sheets-Sheet 3

INVENTORS:
WILLIAM L. GROSS
JOHN O. P. HUGHES

BY *Babcock & Babcock*
ATTORNEYS

Patented Apr. 29, 1952

2,594,642

UNITED STATES PATENT OFFICE 2,594,642

GEARING OF ACCESSORIES FOR GAS TURBINES

William Lawrence Gross and John Oliver Philip Hughes, Rugby, England, assignors to The English Electric Company Limited, London, England, a British company Application February 21, 1949, Serial No. 77,642
In Great Britain February 26, 1948

8 Claims. (Cl. 230—132)

This invention relates to the gearing of the accessories for gas turbines, such as a lubricating oil pump, fuel pump, starter motors and the like. This gearing is arranged in a common gear box which is streamlined and connected with the wall of the air intake by means of fins of aerofoil cross section through which the shafts for the accessories and the lubrication oil ducts etc. are passed outwards.

According to a main feature of the invention the bevel gears for the temporarily engaged accessories such as starter motors encompass a separate bevel pinion and bevel gears for the permanently engaged accessories such as lubricating oil and fuel feeder pumps whereby the apices of the two different bevel gear systems can be arranged closely to one another.

According to another important feature of the invention the bevel gear meshing with the bevel wheel of the starter motor shafts is connected with the compressor rotor through a maximum speed device such as a ratchet gear disengaging it upon exceeding a predetermined speed, while the bevel pinion meshing with the bevel gears for the slow running accessories is permanently coupled in operation with the said rotor.

The gear box contains also the main front journal and thrust bearing of the compressor rotor with which the accessories gearing is connected by longitudinally slidable means only so that it can be readily assembled and withdrawn in an axial direction.

Figure 1:
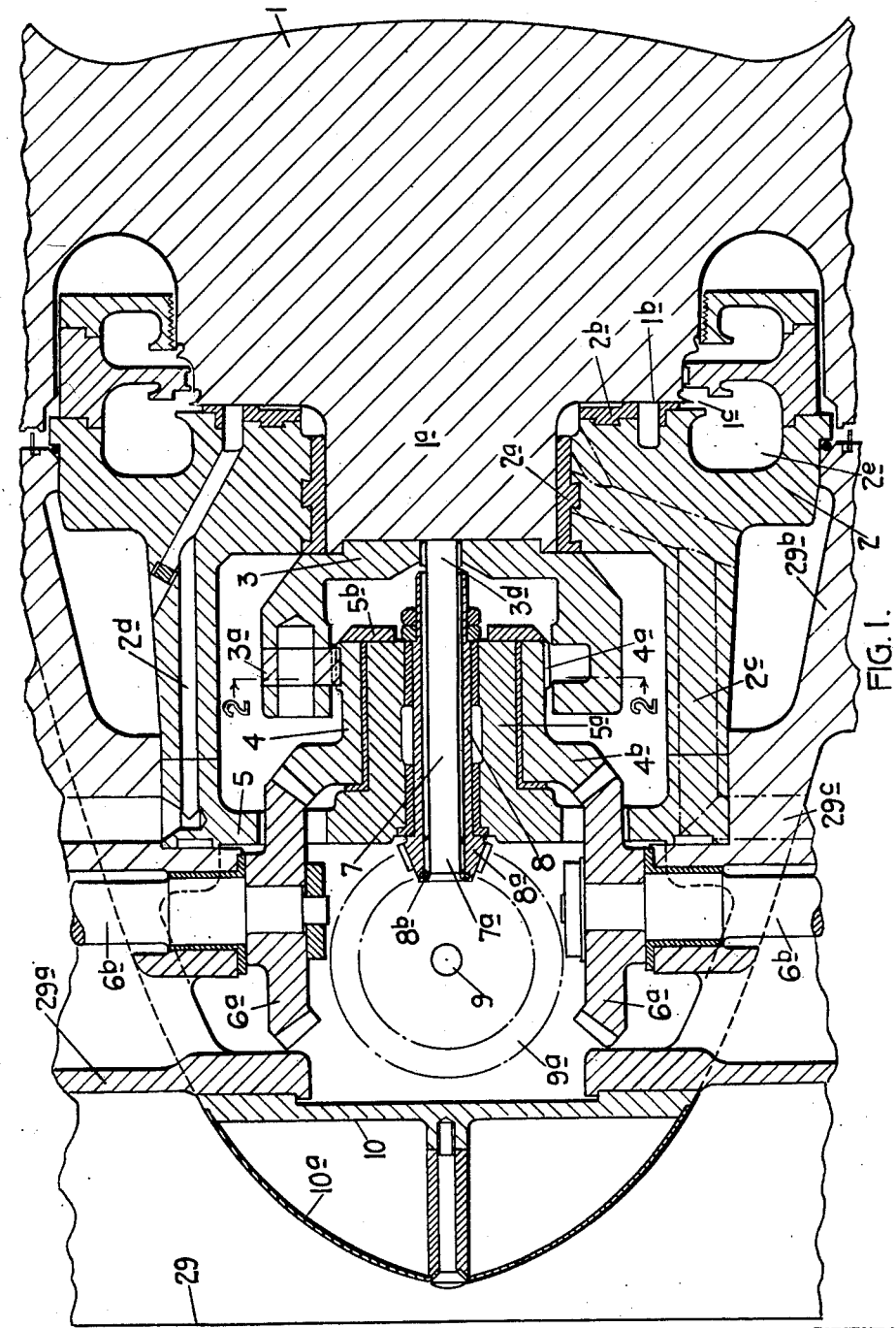
Figure 2:
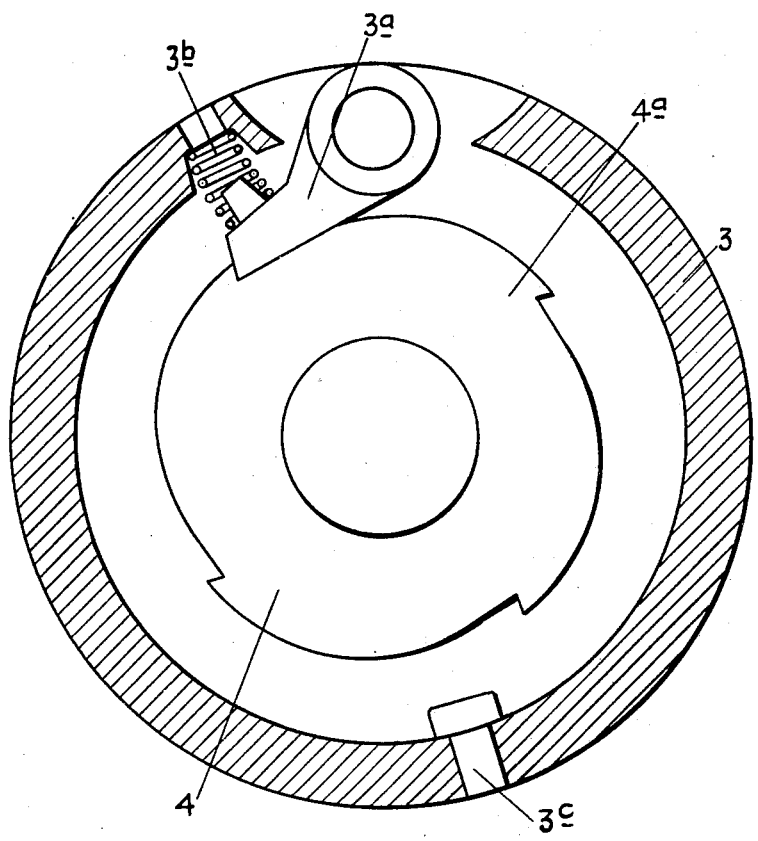
Figure 3:
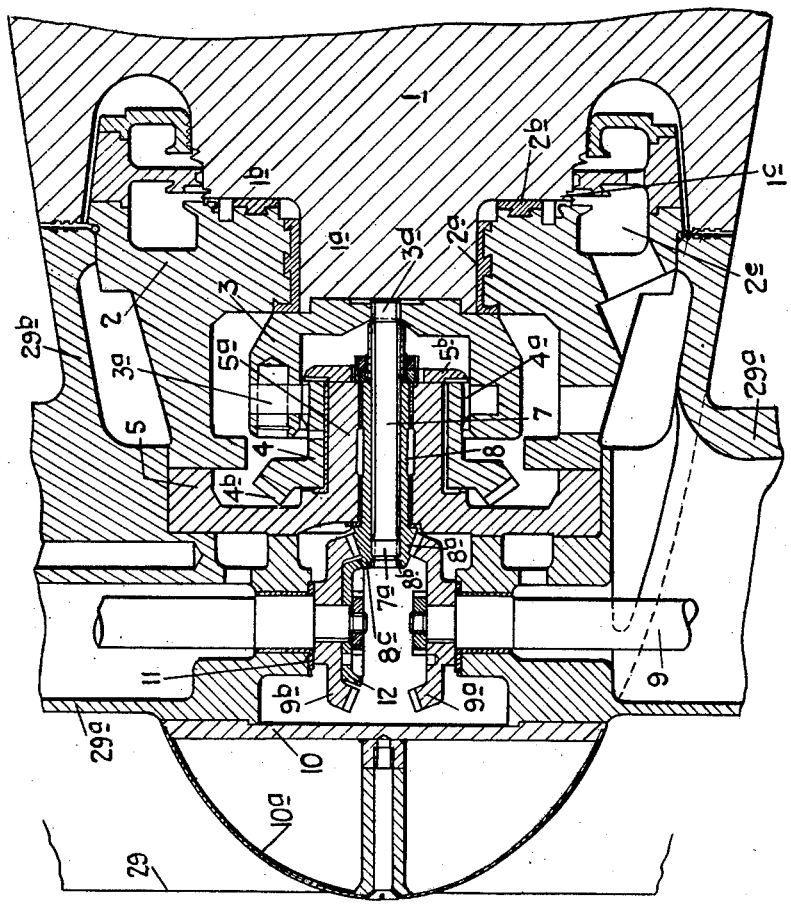

In order that these and other features of the invention be better understood and readily carried into effect, an embodiment of the invention will now be described by way of example with reference to the accompanying drawings, of which Fig. 1 is a horizontal longitudinal section through a gear box according to the invention, Fig. 2 is a cross section of a detail on line 2—2 of Fig. 1, on a larger scale, and Fig. 3 is a vertical longitudinal section of a similar but improved gear box shown on a smaller scale.

The front disc 1 of the compressor rotor is journalled with its journal 1a in the bearing 2a which is combined with a thrust bearing 2b in a common casing 2. The shoulder 1b of the disc 1 abuts against the said thrust bearing 2b. The front of the journal 1a is recessed, and a cup-shaped body 3 is spigoted into the recess and connected with the journal 1a for rotation by screw bolts and dowel pins (not shown). A pawl 3a is pivoted near the circumference of the body 3 and biased inwards by a spring 3b into engagement with the ratchet wheel portion 4a of the hub 4 of a bevel gear 4b. A counterpoise 3c is arranged diametrically opposite the pawl 3a and spring 3b in order to balance the pawl 3a dynamically in its disengaged position which it occupies during the whole working range of the gas turbine.

The hub 4 is journalled on the central portion 5a of a stationary body 5 flanged to the bearing body 2. The hub 4 is located axially between a shoulder of the body 5 and a plate 5b attached to the rear face of the central portion 5a by bolts and dowel pins (not shown).

The bevel gear 4b meshes with two bevel gears 6a, each keyed to a shaft 6b connected with one of the usual electric starter motors (not shown). The shafts 6b are journalled in the spokes 29a of the air intake 29 of the compressor to the inner portion 29b of which the bearing body 2 is spigoted. The fact that the starter motors are in use only up to the self-running speed of the gas turbine allows the bevel wheel 4b which they drive to be of much larger pitch circle diameter than would be permissible for a continuously driven gear. This allows the concentric arrangement of said bevel wheel 4b with a bevel pinion 8a which will be described later.

Lubricating oil is supplied to the main front journal surfaces 1a and 2a and to the thrust bearing surfaces 1b and 2b, through the ducts 29c and 2c in one of the horizontal spokes. This duct 2c issues into an annular recess in the thrust face 2b which divides it into an inner, principal thrust face, and an outer secondary one which is slightly relieved. Lubricating oil emerging from the inner principal thrust face and from the journal bearing 2a is drained off through a duct 2d in one of the lateral spokes 29a. Lubricating oil emerging outward from the secondary thrust face is drained off from the annular space 2e into which it is thrown by the first flinger 1c from which space it is drained by gravity through the lower vertical spoke 29a (Fig. 3).

The base of the body 3 has a splined hole 3d engaged by the splined rear end of a quill shaft 7, the splined front end 7a of which engages the splined bore of a tubular member 8, which is integral with the bevel pinion 8a. The tubular member 8 is journalled for rotation and axial thrust in the central portion 5a. The quill shaft 7 is secured in the axial direction by a circular clip 8b in the mouth of the pinion 8a.

The bevel pinion 8a meshes with two bevel gears of which only the lower one, 9a that drives the shaft 9 of the lubricating oil pump for all bearings of the gas turbine is shown. Shaft 9 is journalled in a spoke of the air intake similar to what is shown for the shafts 6b in the spokes 29a. In alignment with shaft 9 there is a shaft (not shown) of the fuel oil pump, geared to the pinion 8a in a way similar to that shown for shaft 9. It will be seen that the arrangement described allows the apices of the two gear drives 8a, 9a and 4b, 6a, 6b, to be brought very near to one another whereby the shafts of all the auxiliaries can be passed outside through spokes of the same aerofoil cross section.

The gear box is closed at its front end by a cover plate 10 having a streamlined fairing 10a and spigoted to the front face of the inner portion 29b of the air intake body.

It will be seen that the air intake body 29 with the shafts 6a and 9 (and the shaft not shown for the fuel pump) can be withdrawn axially (to the left in Fig. 1). Similarly the body 5 can be axially withdrawn, leaving only the body 3 on the end of the journal 1a, which body can, in turn be withdrawn axially from said journal. Assembly is, of course, effected in the inverse succession.

In operation the bevel pinion 8a drives permanently the gear wheel 9 for the lubricating pump and the opposite one (not shown) for the fuel pump.

For starting, the starter motors (not shown) drive the shafts 6b, gear wheels 6a, gear wheel 4b, and through the ratchet clutch 4a, 3a the hollow body 3, and eventually the compressor rotor 1 which is supposed to be integral with, or coupled to, the rotor of the charging turbine (not shown). As soon as the turbine overruns the starter motors, the pawl 3a leaves the undercut teeth of the ratchet wheel 4a, the centrifugal force of the pawl 3a being greater than the opposing force of the bias spring 36, which it could not be if the engaging faces lay on a radial line from the axis of rotation of the ratchet wheel, and disengages the ratchet clutch without any danger of the pawl 3a hammering the ratchet wheel 4a. The starter motors are then switched off, and the turbine set keeps rotating under its own power, as usual.

Referring now to Fig. 3 of the accompanying drawings, provision is made to prevent the upper bevel wheel 9b from riding into mesh with the bevel pinion 8a on the overrun, when the axial upward thrust which normally holds the bevel wheel 9b against the thrust collar 11 becomes negligible.

A cup 12 assembled on the front face of the bevel wheel 9b rolls on a conical extension 8c of the bevel pinion 8a. These surfaces come into contact under a light load only and if no true rolling motion occurs this is unimportant. The dimensions of the cup 12 and of the extension 8c are chosen so that the teeth of the bevel wheel 9b cannot penetrate too deeply into those of the bevel pinion 8a.

This arrangement can be confined to the upper bevel wheel 9b, while the weight of the lower bevel wheel 9a and of its shaft 9 is sufficient to prevent this gear from riding into mesh with the bevel pinion 8a.

What we claim as our invention and desire to secure by Letters Patent is:

1. A gearing for the accessories of a gas turbine set having a compressor rotor, a compressor stator, and an air intake to the compressor stator in alignment with its axis, said gearing comprising a common gear box arranged within said air intake, fins having aerofoil cross section connecting said gear box with said air intake, shafts for the accessories passing through the said fins, two separate bevel gear systems arranged inside the said gear box, the one system comprising bevel gear wheels on some of said accessories shafts and a bevel gear wheel coaxial with and engaged with said compressor rotor and meshing with said bevel gear wheels on accessories shafts, the other system comprising a bevel gear pinion coaxial with and engaged with said compressor rotor and bevel gear wheels arranged on the other accessories shafts and meshing with said bevel gear pinion, the said first bevel gear system encompassing the said second bevel gear system, the apices of the said two separate systems being arranged closely to one another, axially slidable clutch means connecting the said two bevel gear systems with the said compressor rotor, a journal bearing and a thrust bearing for said compressor rotor arranged in the said gear box, the said two bevel gear systems being engaged with said compressor rotor by the said axially slidable clutch means only whereby it can be assembled and withdrawn in an axial direction.

2. A gearing as claimed in claim 1 wherein the said thrust bearing has an inner principal thrust face and a secondary outer thrust face separated from and slightly relieved with respect to said principal thrust face, and comprising a lubricating oil duct arranged in one of said fins and adapted to supply oil to the space separating the said inner and outer thrust face, a lubricating oil duct arranged in another of said fins and adapted to drain oil under pressure from the space between the said inner thrust face and the said journal bearing, and a lubricating oil duct arranged in still another one of said fins adapted to drain lubricating oil by gravity from the space surrounding said outer thrust face.

3. A gearing as claimed in claim 1 comprising a bevel gear wheel of the first bevel gear system coaxial with the compressor rotor a maximum speed device adapted to connect the said rotor with the said bevel gear wheel below a predetermined speed and to disengage the same at a speed exceeding said predetermined speed, and a bevel gear pinion of the second bevel gear system permanently connected with said rotor in operation.

4. A gearing as claimed in claim 1, comprising a ratchet wheel fixedly connected to the bevel gear wheel of the first bevel gear system coaxial with the compressor rotor, undercut teeth on said ratchet wheel, a pawl pivoted on the said compressor rotor, and a spring biasing the said pawl into engagement with the said ratchet wheel teeth, the center of gravity of the said pawl being so arranged that centrifugal force acting on said pawl opposes the action of said spring.

5. A gearing as claimed in claim 4, comprising a counterpoise arranged diametrically opposite the said pawl and dynamically balancing the said pawl in its position disengaged from said ratchet wheel.

6. A gearing as claimed in claim 5 comprising a dished member spigoted and bolted to the front face of the compressor rotor journal, the said pawl and said counterpoise being arranged on the circumference of said dished member.

7. A gearing for the accessories of a gas turbine set having a compressor rotor, a compressor stator, and an air intake to the compressor stator in alignment with its axis, said gearing comprising a common gear box arranged within said air intake, fins having aerofoil cross section connecting said gear box with said air intake, shafts for the accessories passing through the said fins, two separate bevel gear systems arranged inside the said gear box, the one system comprising bevel gear wheels on some of said accessories shafts and a bevel gear wheel coaxial with and engaged with said compressor rotor and meshing with said bevel gear wheels on accessories shafts, the other system comprising a bevel gear pinion coaxial with and engaged with said compressor rotor and bevel gear wheels arranged on the other accessories shafts and meshing with said bevel gear pinion, the said first bevel gear system encompassing the said second bevel gear system, the apices of the said two separate systems being arranged closely to one another, a ratchet wheel fixedly connected to the bevel gear wheel of the first bevel gear system coaxial with the compressor rotor, undercut teeth on said ratchet wheel, a pawl pivoted on the said compressor rotor, and a spring biasing the said pawl into engagement with the said ratchet wheel teeth, the centre of gravity of the said pawl being so arranged that centrifugal force acting on said pawl opposes the action of said spring, a counterpoise arranged diametrically opposite the said pawl and dynamically balancing the said pawl in its position disengaged from said ratchet wheel, axially slidable clutch means connecting the said two bevel gear systems with the said compressor rotor, a journal bearing and a thrust bearing for said compressor rotor arranged in the said gear box, the said two bevel gear systems being engaged with said compressor rotor by the said axially slidable clutch means only whereby it can be assembled and withdrawn in an axial direction, and a central projection of the said gear box extending towards the front face of the compressor rotor journal, the said bevel gear wheel coaxial with said rotor and the said ratchet wheel being externally journalled on the said extension.

8. A gearing as claimed in claim 7, comprising a tubular shaft internally journalled in said central projection and carrying at its end remote from said rotor the said bevel gear pinion and a quill shaft arranged with clearance inside said tubular shaft and in spline connection at its one end with the said tubular shaft and at its other end with the said dished member.

WILLIAM LAWRENCE GROSS.
JOHN OLIVER PHILIP HUGHES.

REFERENCES CITED

The following references are of record in the file of this patent:

UNITED STATES PATENTS

| Number | Name | Date |
| --- | --- | --- |
| 1,856,443 | Stoeckicht | May 3, 1932 |
| 2,427,846 | Forsyth | Sept. 23, 1947 |
| 2,459,935 | Halford | Jan. 25, 1949 |
| 2,474,258 | Kroon | June 28, 1949 |
| 2,476,218 | Prime et al. | July 12, 1949 |
| 2,479,573 | Howard | Aug. 23, 1949 |
| 2,479,776 | Price | Aug. 23, 1949 |